United States Patent
Bromwich

(10) Patent No.: US 8,046,374 B1
(45) Date of Patent: *Oct. 25, 2011

(54) AUTOMATIC TRAINING OF A DATABASE INTRUSION DETECTION SYSTEM

(75) Inventor: Adam Bromwich, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1588 days.

This patent is subject to a terminal disclaimer.

(21) Appl. No.: 11/124,461

(22) Filed: May 6, 2005

(51) Int. Cl.
*G06F 17/30* (2006.01)
*G06F 15/16* (2006.01)

(52) U.S. Cl. ........... 707/759; 707/781; 707/952; 726/23

(58) Field of Classification Search .................. 707/3, 6, 707/9, 999.003, 999.004, 999.006, 999.009, 707/952, 781, 759, 703; 726/23
See application file for complete search history.

(56) References Cited

U.S. PATENT DOCUMENTS

| | | | |
|---|---|---|---|
| 4,959,849 A * | 9/1990 | Bhusri | 379/32.01 |
| 5,040,214 A | 8/1991 | Grossberg et al. | |
| 5,355,474 A * | 10/1994 | Thuraisngham et al. | 707/9 |
| 5,584,024 A | 12/1996 | Shwartz | |
| 5,664,172 A | 9/1997 | Antoshenkov | |
| 5,694,595 A | 12/1997 | Jacobs et al. | |
| 5,742,806 A | 4/1998 | Reiner et al. | |
| 5,768,422 A | 6/1998 | Yaeger | |
| 5,826,076 A | 10/1998 | Bradley et al. | |
| 5,961,582 A | 10/1999 | Gaines | |
| 6,088,803 A | 7/2000 | Tso et al. | |
| 6,128,740 A | 10/2000 | Curry et al. | |
| 6,282,546 B1 | 8/2001 | Gleichauf et al. | |
| 6,311,278 B1 | 10/2001 | Raanan et al. | |
| 6,314,409 B2 | 11/2001 | Schneck et al. | |
| 6,321,337 B1 | 11/2001 | Reshef et al. | |
| 6,356,887 B1 | 3/2002 | Berenson et al. | |
| 6,584,569 B2 | 6/2003 | Reshef et al. | |
| 6,598,038 B1 | 7/2003 | Guay et al. | |
| 6,769,009 B1 | 7/2004 | Reisman | |
| 6,775,657 B1 | 8/2004 | Baker | |

(Continued)

FOREIGN PATENT DOCUMENTS

WO    WO 01/71499 A1    9/2001

OTHER PUBLICATIONS

Christopher Kruegel, Giovanni Vigna; "Anomaly Detection of Web-based Attacks," Oct. 2003; CCS'03; p. 251-261.*

(Continued)

*Primary Examiner* — Jacob F Bétit
*Assistant Examiner* — Dennis Truong
(74) *Attorney, Agent, or Firm* — Fenwick & West LLP

(57) ABSTRACT

A database intrusion detection system (DIDS) automatically trains itself to account for changes to the database. The DIDS monitors upstream queries sent to the database and downstream data provided in response to the queries. The DIDS classifies an upstream query as legitimate or anomalous. If the query is anomalous, the DIDS determines whether the anomaly resulted from a change in the database by performing one or more tests. One test determines whether the query references new fields or tables. Another test determines the frequency at which the query is received, and/or whether the query is received from multiple sources. A third test determines whether the query accesses sensitive information. Together, the results of these tests describe whether the query should be classified as anomalous or legitimate.

25 Claims, 5 Drawing Sheets

U.S. PATENT DOCUMENTS

| | | | |
|---|---|---|---|
| 6,775,827 B1 | 8/2004 | Harkins | |
| 6,839,850 B1 | 1/2005 | Campbell et al. | |
| 6,851,113 B2 | 2/2005 | Hemsath | |
| 6,928,553 B2 | 8/2005 | Xiong et al. | |
| 7,047,369 B1 | 5/2006 | Gruper et al. | |
| 7,050,936 B2 | 5/2006 | Levy et al. | |
| 7,085,780 B2* | 8/2006 | Sakamoto et al. | 707/200 |
| 7,085,928 B1 | 8/2006 | Schmid et al. | |
| 7,120,645 B2 | 10/2006 | Manikutty et al. | |
| 7,120,933 B2 | 10/2006 | Mattsson | |
| 7,124,173 B2 | 10/2006 | Moriarty | |
| 7,185,232 B1 | 2/2007 | Leavy et al. | |
| 7,237,265 B2 | 6/2007 | Reshef et al. | |
| 7,240,201 B2 | 7/2007 | Neufeld et al. | |
| 7,254,626 B1 | 8/2007 | Kommula et al. | |
| 7,296,274 B2 | 11/2007 | Cohen et al. | |
| 7,308,715 B2 | 12/2007 | Gupta et al. | |
| 7,444,331 B1 | 10/2008 | Nachenberg et al. | |
| 2002/0065896 A1 | 5/2002 | Burakoff et al. | |
| 2002/0083343 A1 | 6/2002 | Crosbie et al. | |
| 2002/0087882 A1 | 7/2002 | Schneier et al. | |
| 2002/0157020 A1* | 10/2002 | Royer | 713/201 |
| 2003/0037251 A1* | 2/2003 | Frieder et al. | 713/200 |
| 2003/0051026 A1 | 3/2003 | Carter et al. | |
| 2003/0069880 A1 | 4/2003 | Harrison et al. | |
| 2003/0101355 A1 | 5/2003 | Mattsson | |
| 2003/0133554 A1 | 7/2003 | Nykanen et al. | |
| 2003/0145226 A1 | 7/2003 | Bruton et al. | |
| 2003/0154402 A1 | 8/2003 | Pandit et al. | |
| 2003/0167229 A1 | 9/2003 | Ludwig et al. | |
| 2003/0188189 A1 | 10/2003 | Desai et al. | |
| 2003/0204719 A1 | 10/2003 | Ben-Itzhak | |
| 2003/0221123 A1 | 11/2003 | Beavers | |
| 2003/0233583 A1 | 12/2003 | Carley | |
| 2004/0098617 A1 | 5/2004 | Sekar | |
| 2004/0098623 A1 | 5/2004 | Scheidell | |
| 2004/0193656 A1 | 9/2004 | Pizzo et al. | |
| 2004/0199535 A1 | 10/2004 | Zuk | |
| 2004/0199647 A1 | 10/2004 | Ramarao et al. | |
| 2004/0205360 A1 | 10/2004 | Norton et al. | |
| 2004/0220915 A1* | 11/2004 | Kline et al. | 707/3 |
| 2004/0250127 A1 | 12/2004 | Scoredos et al. | |
| 2004/0250134 A1 | 12/2004 | Kohler et al. | |
| 2004/0260945 A1 | 12/2004 | Raikar et al. | |
| 2005/0071643 A1 | 3/2005 | Moghe | |
| 2005/0086529 A1* | 4/2005 | Buchsbaum | 713/201 |
| 2005/0097149 A1* | 5/2005 | Vaitzblit et al. | 707/202 |
| 2005/0138006 A1 | 6/2005 | Bennett et al. | |
| 2005/0138110 A1 | 6/2005 | Redlich et al. | |
| 2005/0138425 A1 | 6/2005 | Kim et al. | |
| 2005/0138426 A1 | 6/2005 | Styslinger | |
| 2005/0154733 A1 | 7/2005 | Meltzer et al. | |
| 2005/0192995 A1 | 9/2005 | Li et al. | |
| 2005/0203886 A1* | 9/2005 | Wong | 707/3 |
| 2005/0203921 A1* | 9/2005 | Newman et al. | 707/100 |
| 2005/0273859 A1 | 12/2005 | Chess et al. | |
| 2005/0289187 A1 | 12/2005 | Wong et al. | |
| 2006/0070128 A1 | 3/2006 | Heimerdinger et al. | |
| 2006/0117386 A1 | 6/2006 | Gupta et al. | |
| 2006/0212438 A1 | 9/2006 | Ng | |
| 2006/0212941 A1 | 9/2006 | Bronnikov et al. | |
| 2006/0242136 A1 | 10/2006 | Hammond et al. | |
| 2006/0265689 A1 | 11/2006 | Kuznetsov et al. | |
| 2007/0074188 A1 | 3/2007 | Huang et al. | |
| 2007/0094728 A1 | 4/2007 | Julisch et al. | |
| 2007/0169194 A1 | 7/2007 | Church et al. | |

OTHER PUBLICATIONS

AirCERT web page, last updated Sep. 18, 2000 [online]. Cert.org [retrieved Apr. 18, 2003]. Retrieved from the Internet<URL:http://www.cert.org/kb/aircert/>.

Change log for Analysis Console for intrusion Detection (Acid), indicating release date of Sep. 8, 2000 [online]. Andrew.cmu.edu [retrieved Apr. 18, 2003]. Retrieved from the Internet:<URL:http://www.andrew.cmu.edu/~rdanyliw/snort/CHANGELOG>.

CyberGuard Corporation, "CyberGuard and Webwasher: The Value Proposition," A CyberGuard Corporation White Paper, May 2004, 6 pages.

e=SECURITY, INC., Correlation Technology for Security Event Management, Oct. 7, 2002 [online]. eSecurityins.com [retrieved Apr. 18, 2003]. Retrieved from the Internet:<URL:http://www.esecurityinc.com/downloads/Correlation_WP.pdf>.

Marketing, "Digital Certificates—Best Practices—A Microdasys Whitepaper," bestpractice.doc, Revision 1.1 (Jul. 31, 2003), 6 pages, Czech Republic.

Microdasys, "S C I P. Secured Content Inspection: Protecting the Enterprise from CryptoHacks," 2003 by Microdasys Inc., 2 pages, Czech Republic.

MyNetWatchman.com web pages indicating 9/00 beta release [online]. MyNetWatchman.com [retrieved Apr. 18, 2003]. Retrieved from the Internet<URL:http://www.mynetwatchman.com/mynetwatchman>.

Parkhouse, Jayne, "Pelican Save TNet 2.0," [online] Jun. 2000, SC Magazine Product Review, [retrieved Dec. 1, 2003] Retrieved from the Internet<URL:http://www.scmagazine.com/standalone/pelican/sc_pelican.html>.

"PostgreSQL Interactive Documentation," May 2001, [online] [Archived by http://archive.org on Jun. 6, 2001; Retrieved on Dec. 19, 2006] Retrieved from the internet<URL:http://web.archive.org/web/20010606011227/www.postgresql.org/idocs/index.php?overv...>.

2000 Review of eSecurity product on Network Security web page [online]. SCMagazine.com [retrieved Apr. 18, 2003]. Retrieved from the Internet<URL:http://www.scmagazine.com/scmagazine/2000_12/testc/network.htm#Open>.

Schneier, Bruce. Managed Security Monitoring: Network Security for the $21^{st}$ Century, 2001 [online]. Conterpane.com [retrieved Apr. 18, 2003]. Retrieved from the Internet<URL:http://www.counterpane.com/msm.pdf>.

Slashdot.org web pages describing Dshield, dated Nov. 27, 2000 [online]. Slashdot.org [retrieved Apr. 18, 2003]. Retrieved from the Internet:<URL:http://slashdot.org/article.pl?sid=00/11/27/1957238& mode=thread>.

SSL Stripper Home Page, "Security Solutions: Sample Screenshots," [online]. Retrieved on Mar. 18, 2005. Retrieved from the Ineternet<URL:http://www.vroyer.org/sslstripper/index.html>, 2 pages, Oct. 15, 2004, U.S.A.

SSL Stripper Sample Screenshots. "Security Solutions: Sample Screenshots," [online]. Retrieved on Mar. 18, 20056. Retrieved from the Internet<URL:http://www.vroyer.org/sslstripper/screenshots.html>, 3 pages, Oct. 15, 2004, U.S.A.

Symantec™ Incident Manager http://enterprisesecurity.symantec.com, copyright date Jun. 2003.

Web page, announcing Nov. 11, 2000 release of Dshield [online]. Deja.com [retrieved Apr. 18, 2003]. Retrieved from the Internet<URL:http://groups.google.com/groups?selm= 8vm48v%245pd%241%40nnrp1.deja.com& oe=UTF-8&output=gplain>.

Chung, C.Y. et al., "Demids: A Misuse Detection System for Database Systems," Department of Computer Science, University of California At Davis, Oct. 1, 1999, pp. 1-18.

Johnson R., Protecting Your Data and Your Microsoft SQL Server, Entercept Security Technologies, p. 1-12 [online], Oct. 2, 2002, [retrieved on Jan. 30, 2004]. Retrieved from the Internet: <URL: http://networkassociates.com/us/tier2/products/media/mcatee/wp-sg/protection.pdf>.

Krügel, C. et al., "A Survey on Intrusion Detection Systems," Distributed Systems Group, Technical University of Vienna, Dec. 12, 2000, pp. 1-36.

Lee, S.Y. et al., "Learning Fingerprints for a Database Intrusion Detection System," ESORICS 2002, LNCS 2502, pp. 264-279, Nov. 2002, Springer-Verlag, Germany.

Low, W.L. et al., "DIDAFIT: Detecting Intrusions in Databases Through Fingerprinting Transactions," ICEIS 2002—Databases and Information Systems Integration, 2002, pp. 121-128.

Ramasubramanian, P. et al., "Quickprop Neural Network Ensemble Forecasting Framework for a Database Intrusion Predicition System," Neural Information Processing—Letters and Reviews, Oct. 2004, pp. 9-18, vol. 5, No. 1.

Solutions by Tech Target, Entercept Databases Edition, Nov. 2002, [retrieved on Jan. 9, 2004]. Retrieved from the Internet: <URL: http://infosecuritymag.techtarget.com/2002/nov/solutions,shtml>.

Valeur, F. et al, "A Learning-Based Approach to the Detection of SQL Attacks," Proceedings of the Conference on Detection of Intrusions and Malware & Vulnerability Assessment (DIMVA), Vienna; Austria, Jul. 2005, 18 pages.

Archive of "Postgre SQL 7.1 Documentation," www.postgresql.org [online] [Archived by http://archive.org on Jun. 6, 2001; Retrieved May 2001] Retrieved from the internet<URL:http://web.archive.org/web/20010606011227/www.postgresql.org/idocs/idex.php?overv...>.

Oracle, "Understanding Query Expressions,"Oracle 8 ConText Cartridge Application Developer's Guide, Release 2.3, 1997, [online] [Retrieved on Mar. 9, 2007] Retrieved from the Internet<URL:http://download-east.oracle.com/docs/cd/A58617_01/cartridg.804/a58164/ch03.htm>.

Pfleeger, Charles P., "Security in Computing," $2^{nd}$ edition, 1996, pp. 426-433.

Weisstein, E.W., "The CRC Concise Encyclopedia of Mathematics," 1998, p. 1726.

Analysis Console for Intrusion Detection (ACID) web page [online]. Andrew.cmu.edu, Published and retrieved Apr. 18, 2003. Retrieved from the Internet<URL:http://www.andrew.cmu.edu/~rdanyliw/snort/snortacid.html>.

"Caltarian Security Technology Platform," Riptech web pages [online]. Symantec.com, Published and retrieved Apr. 18, 2003. Retrieved from the Internet<URL:http://wnterprisesecurity.symantec.com/Content/displayPDF.cfm?SSSPDFID=35& EID=O>.

Halfond, W.G.J. et al., "Combining Static Analysis and Runtime Monitoring to Counter SQL-Injection Attacks," Workshop on Dynamic Analysis (WODA 2005), May 17, 2005, St. Louis, MO, USA.

Network Computing Solutions—"Microdasys SCIP," 2003, [online]. Retrieved on Mar. 18, 2005. Retrieved from the Internet<URL:http://www.ncs/cz/index.php?language=en&menuitem-4&subitem=13>, 2 pages, Czech Republic.

Network Computing Solutions—NCS Homepage—News, 2003, [online]. Retrieved on Mar. 18, 2005. Retrieved from the Internet<URL:http:/nsc.cz/index/php?language=en&menuitem=0&subitem=4&subitem=13>, 3 pages, Czech Republic.

SCIP Product, Microdasys—"The need to control, inspect and manage encrypted webtraffic." [online]. Published and retrieved on Mar. 18, 2005. Retrieved from the Internet<URL:http://www.microdasys.com/scipproduct+M54a708de802.html>. Author unknown, 2 pages, Czech Republic.

"SSL Stripper Installation Guide," [online]. Published and retrieved in Mar. 2005. Retrieved from the Internet<URL:http://www.sslstripper.com>, 2 pages, U.S.A.

Webwasher AG/Full feature set, "Full feature set," [online]. Published and retrieved on Mar. 18, 2005. Retrieved from the Internet<URL:http://www.webwasher.com/enterprise/products/webwasher_products/ssl_scanner/full_feature_set..html?l...>, 2 pages.

Webwasher AG/Webwasher Anti Spam, "Webwasher Anti Spam," [online]. Published and retrieved on Mar. 18, 2005. Retrieved from the Internet<URL:http://www.webwasher.com/enterprise/products/webwasher_products/anti_spam/index.htm...>, 1 page.

Webwasher AG/Webwasher Anti Virus, "Webwasher Anti Virus," [online]. Published and retrieved on Mar. 18, 2005. Retrieved from the Internet<URL:http://www.webwasher.com/enterprise/products/webwasher_products/anti_virus/index.html..>, 2 pages.

Webwasher AG/Webwasher Content Protection,"Webwasher Content Protection," [online]. Published and retrieved on Mar. 18, 2005. Retrieved from the Internet<URL:http://www.webwasher.com/enterprise/products/webwasher_products/content_protection/index.html>, 2 pages.

Webwasher AG/Webwasher 1000 CSM Appliance, "Webwasher 1000 CSM Appliance," [online]. Published and retrieved on Mar. 18, 2005. Retrieved from the Internet<URL:http://www.webwasher.com/enterprise/products/webwasher_products/scm_appliance/index...> 2 pages.

Webwasher AG/Webwasher SSL Scanner, "Webwasher SSL Scanner," [online]. Published and retrieved on Mar. 18, 2005. Retrieved from the Internet<URL:http://www.webwasher.com/enterprise/products/webwasher_products/ssl_scanner/index.html >, 2 pages.

Webwasher AG/Webwasher URL Filter, "Webwasher URL Filter," [online]. Published and retrieved on Mar. 18, 2005. Retrieved from the Internet<URL:http://www.webwasher.com/enterprise/products/webwasher_products/webwasher_url_filter..>, 1 page.

* cited by examiner

US 8,046,374 B1

AUTOMATIC TRAINING OF A DATABASE INTRUSION DETECTION SYSTEM

BACKGROUND OF THE INVENTION

1. Field of the Invention

This invention pertains in general to computer security and in particular to detecting database intrusion and data theft attempts.

2. Description of the Related Art

Databases are widespread in modern computing environments. Companies and other enterprises rely on databases to store both public and private data. Many enterprises provide publicly-accessible interfaces to their databases. For example, an electronic commerce web site typically includes a "search" field that accepts search terms and allows an end-user to search items for sale on the site. This search field is a publicly-accessible interface to a database that stores data describing the items for sale. Similarly, an enterprise can maintain a private database that is accessible to only employees of the enterprise.

At a technical level, many of these databases work by having a web server provide a web browser executing on the client with an HTML and/or JAVASCRIPT™-based form. The web browser displays this form on the client, and the end-user provides values for the fields in the form. The end-user performs an action, such as pressing a "Submit" button, that causes the web browser to send the entered values to the server. At this point, back-end logic at the server constructs a query to the database using the user-supplied values. This query executes on the database and the server returns the results to the client web browser.

Malicious end-users can exploit the web interface to the database to perform malicious actions such as obtaining access to confidential information. For example, in an SQL (Structured Query Language) injection attack, the attacker fills out the form using specially-crafted data. These data, when used by the server to generate a query to the database, result in a malicious query being sent to the database on behalf of the attacker.

A database intrusion detection system (DIDS) attempts to detect malicious queries. One type of DIDS works by observing legitimate database queries during a training period and generating a set of templates describing those queries. After the training period, queries that match the templates are allowed to execute while queries that do not match are treated as potentially malicious. This technique works well if the queries encountered during the training period are representative of legitimate queries, the types of queries issued on the database are relatively static, and the database itself is relatively static.

However, training a DIDS is difficult. There are often queries that run at only certain times or dates. For example, a query for generating a quarterly report might run only once every three months. These queries might not be encountered during the training period. Moreover, training the database more frequently or over longer intervals increases the risk that a malicious query will get incorporated into the set of template queries.

Further, queries and databases in the real world are rarely static. It is common for new table and fields to be added to a database. Likewise, new queries will be issued that access these new areas. The new queries will not match the template queries and, as a result, will cause the DIDS to generate false positive intrusion detections.

Therefore, there is a need in the art for a way to train a DIDS and generate templates for legitimate queries that does not suffer from the deficiencies mentioned above.

BRIEF SUMMARY OF THE INVENTION

The above need is met by a database intrusion detection system (DIDS) that automatically trains itself to account for changes to the database. The DIDS monitors upstream queries sent to the database and downstream data provided in response to the queries. The DIDS compares upstream queries to templates of legitimate queries and initially classifies an upstream query as legitimate or anomalous. If the query is anomalous, the DIDS determines whether the anomaly resulted from a change in the database by performing one or more tests. One test determines whether the query references new fields or tables. Another test determines the frequency at which the query is received, and/or whether the query is received from multiple sources. A third test determines whether the query accesses sensitive information. Together, the results of these tests describe whether the query should be classified as anomalous or legitimate. If the query is legitimate, it is added to the legitimate query templates.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
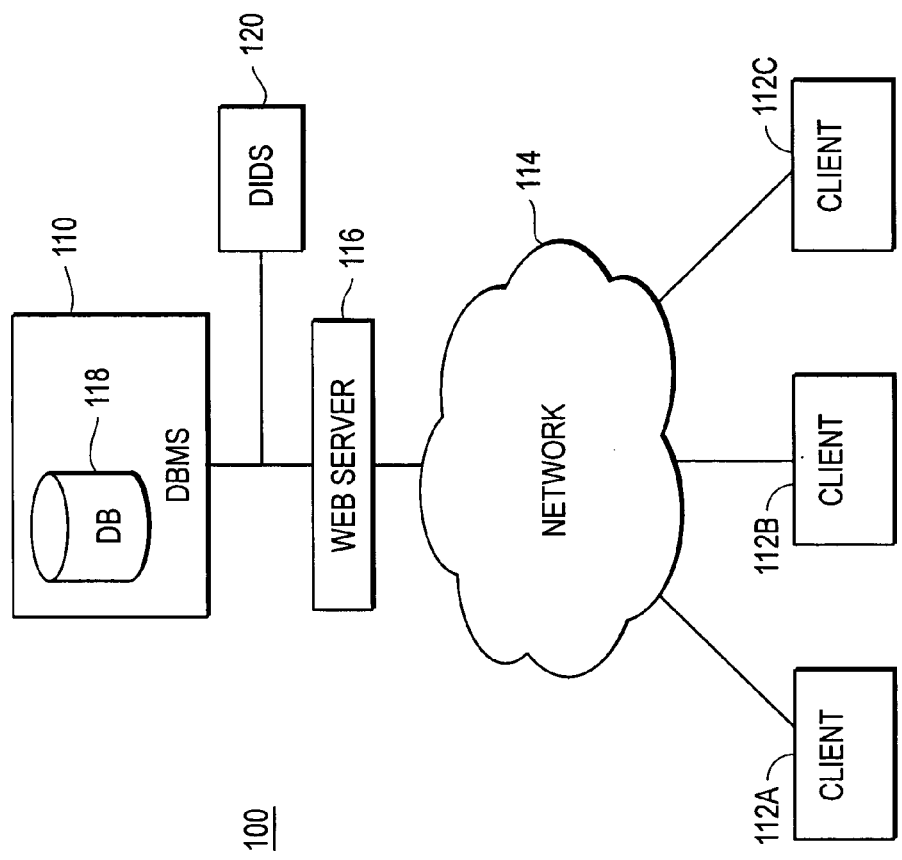
FIG. 1 is a block diagram illustrating a high-level view of a typical environment where it is desirable to detect malicious queries submitted to a database yet minimize false positive detections by automatically training the database to recognize new legitimate queries.

FIG. 1 is a block diagram illustrating a high-level view of a typical environment 100 where it is desirable to detect malicious queries submitted to a database yet minimize false positive detections by automatically training the database to recognize new legitimate queries. The environment includes a database management system (DBMS) 110 in communication with multiple client computers 112 via a network 114. Only three client computers 112 are shown in FIG. 1 for purposes of clarity, but those of skill in the art will recognize that typical environments can have hundreds or thousands of client computers 112, and can also have multiple DBMS 110. Although not shown in FIG. 1, there can be many other computers connected to the network 114.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

The network 114 enables data communication between and among the entities connected to the network and in one embodiment is the Internet. In another embodiment, the network 114 is a local area network (LAN) or wide area network (WAN) operated by an enterprise and is not necessarily coupled to the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 114 can be represented using technologies and/or formats including the hypertext markup language (HTML), the extensible markup language (XML), the simple object access protocol (SOAP) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The DBMS 110 manages a database 118 that stores a collection of information. The information can include, for example, names, addresses, credit card numbers, products offered for sale, medical histories, etc. In one embodiment the database 118 is a relational database and in another embodiment the database is a flat-file database. Although the database 118 is shown within the DBMS 110, it can in fact be external and/or remote from the DBMS. Depending upon the embodiment, the DBMS 110 and/or database 118 can be centralized at one location or distributed over multiple locations. The DBMS 110 receives queries from the client computers 112 and provides data from the database 118 to the client computers in response.

In one embodiment, a web server 116 acts as an intermediary between the DBMS 110 and the client computers 112. The DBMS 110 functionality can also be integrated into the web server 116 or vice-versa. Those of ordinary skill in the art will understand that the web server 116 is absent in some embodiments.

In one embodiment, the web server 116 exchanges data with the client computers 112 using HTTP and/or other protocols. The exchanged data provides a means by which the client computers 112 can access the database 118. The web server 116 receives data from the client computers 112, uses the data to generate queries, and passes the queries to the DBMS 110. The DBMS 110 executes the queries on the database 118 and passes the results of the queries back to the web server 116. The web server 116 then passes the results of the queries back to the client computers 112.

For example, the web server 116 can use HTTP to provide the client computers 112 with encoded web pages having forms for entering data. Browsers on the client computers 112 display the forms, and end-users input data into the forms and instruct the browsers to provide the entered data to the web server 116. The web server 116 receives and extracts the data and uses the data to create queries which it then passes to the DBMS 110 for execution. In one embodiment, the queries are formulated in the Structured Query Language (SQL), but other embodiments can use other languages or techniques for representing the queries. The web server 116 provides the results of the query to the client computers 112 via new encoded web pages.

In another example, the web server 116 uses web services to interact with the client computers 112. The web server 116 utilizes an XML schema that is provided to, or otherwise known by, the client computers 112. The web server 110 receives messages encoded using the XML schema from the client computers 112 via SOAP over HTTP. The web server 116 parses the XML-encoded messages to extract data, and uses the data to create the queries executed by the DBMS 110.

In one embodiment, a database intrusion detection system (DIDS) 120 is connected to the network 114. Although FIG. 1 shows the DIDS 120 connected to the network at a location between the web server 116 and the DBMS 110, any location where the DIDS 120 can monitor queries sent by the client computers 112 and data supplied by the DBMS server 110 in response to the queries will suffice. In one embodiment, all or some of the functionality of the DIDS 120 is integrated into the DBMS 110 and/or web server 116.

The DIDS 120 monitors data exchanged between the DBMS 110 and client computers 112 and detects anomalous queries such as those containing code injection attacks. In one embodiment, the DIDS 120 automatically adapts to changes in the database 118 structure by training itself to recognize new legitimate queries. This training reduces the number of false positive attack detections and allows the DIDS 120 to be used effectively in environments having changing databases. An administrator operates the DIDS 120.

The client computers 112 are utilized by end-users to interact with the DBMS 110. In one embodiment, a client computer 112 is a typical personal computer such as an IBM-PC or Apple Macintosh compatible computer. In another embodiment, a client computer 112 is another type of electronic device, such as a cellular telephone, personal digital assistant (PDA), portable email device, etc. In one embodiment, a client computer 112 executes a web browser that receives an encoded web page from the web server 116 and displays it to the end-user. The web page contains a form for accepting information. The end-user uses a keyboard or other user input device to provide information into the form, and the web browser encodes the information and sends it to the web server 116. In another embodiment, a client computer 112 executes a program for interfacing with the web server 116 using web services.

Figure 2:
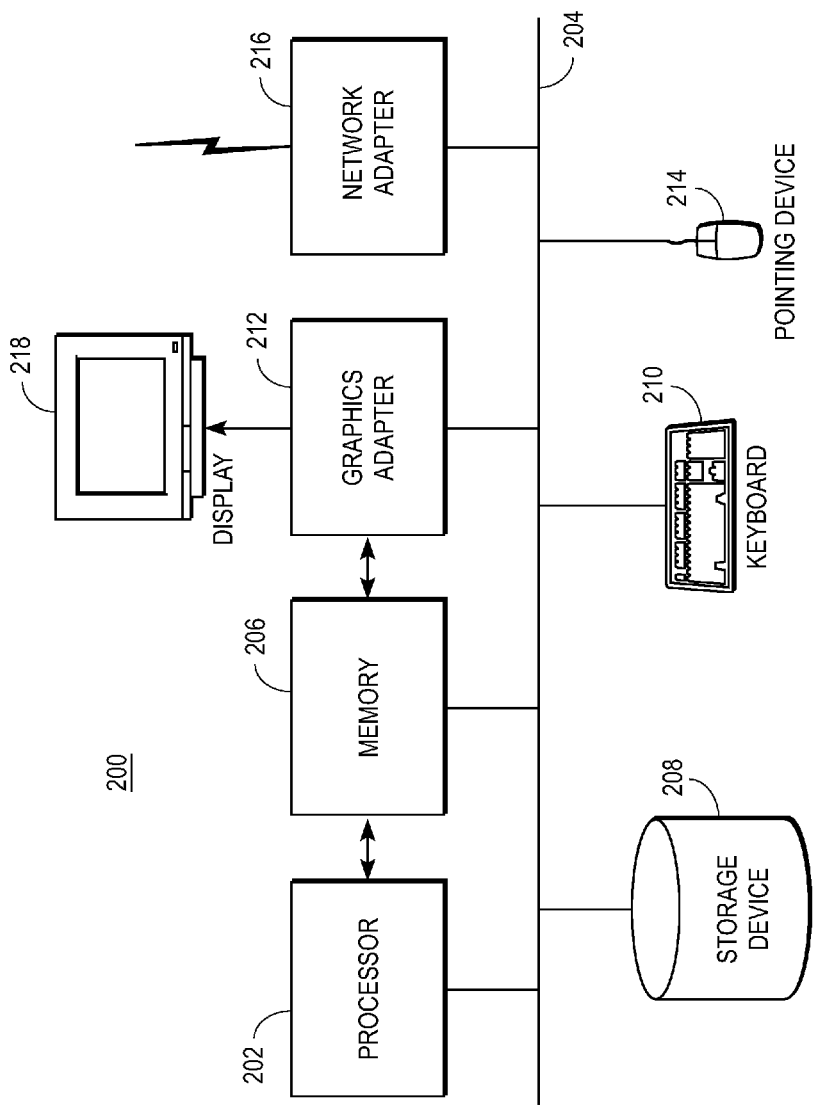
FIG. 2 is a high-level block diagram showing a computer system for acting as a database management system (DBMS) server, web server, database intrusion detection system (DIDS) and/or a client computer according to one embodiment.

FIG. 2 is a high-level block diagram showing a computer system 200 for acting as a DBMS 110, web server 116, DIDS 120 and/or a client computer 112 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. Computer systems acting in different roles may have different and/or additional elements than the ones shown in FIG. 2. For example, a computer system 200 acting as a DBMS 110 or web server 116 may have greater processing power and a larger storage device than a computer system acting as a client computer 112. Likewise, a computer system acting as a DBMS 110 or web server 116 server may lack devices such as a display 218 and/or keyboard 210 that are not necessarily required to operate it.

As is known in the art, the computer system 200 is adapted to execute computer program modules. As used herein, the term "module" refers to computer program logic for providing the specified functionality. A module can be implemented in hardware, firmware, and/or software. When utilized, the modules are loaded into the memory 206 and executed by the processor 202.

Figure 3:
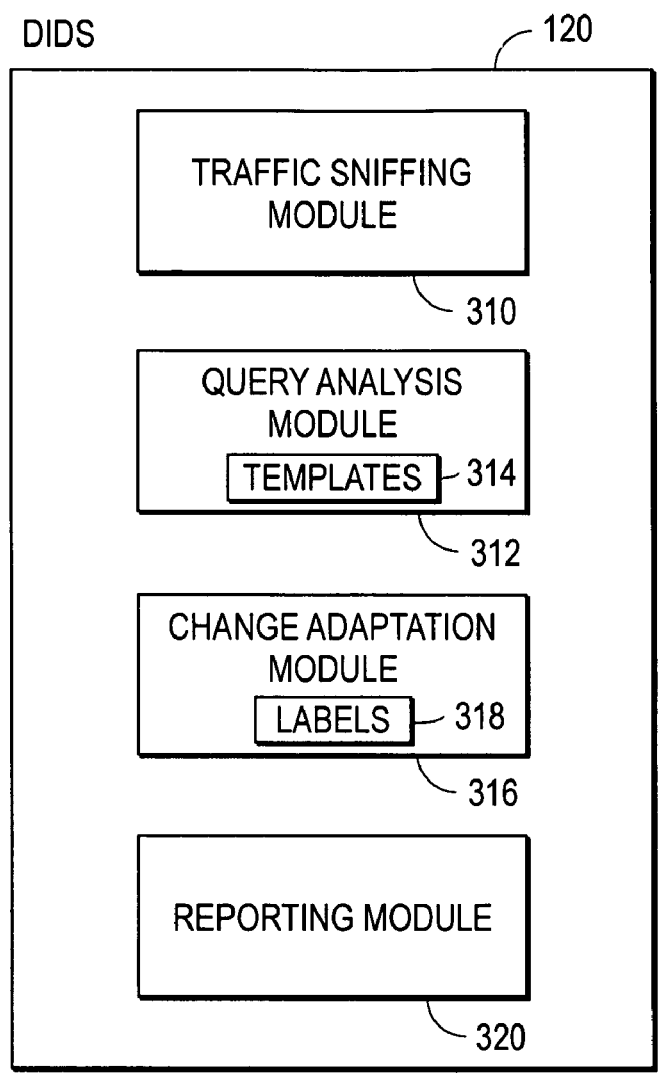
FIG. 3 is a high-level block diagram illustrating a more detailed view of the DIDS according to one embodiment.

FIG. 3 is a high-level block diagram illustrating a more detailed view of the DIDS 120 according to one embodiment. Those of skill in the art will recognize that other embodiments can have different and/or additional modules than those shown in FIG. 3 and the other figures. Likewise, the functionalities can be distributed among the modules in a manner different than described herein.

A traffic sniffing module 310 monitors data sent to and from the DBMS 110. These data include incoming queries from the web server 116, client computers 112, and/or other entities on the network 114 and outgoing data provided by the DBMS server 110 in response to the queries. In one embodiment, the traffic sniffing module 310 maintains state information and can associate an incoming query and the outgoing data produced in response to it. In one embodiment, the sniffing module 310 can block selected queries from reaching the DBMS 110 and/or prevent the results of queries from reaching the client computers 112 or other sources of queries.

A query analysis module 312 examines the incoming queries sniffed by the traffic sniffing module 310 and classifies the queries as legitimate or anomalous. In one embodiment, the query analysis module 312 utilizes a set of query templates 314 to classify an incoming query. The query templates 314 describe legitimate queries on the database 118. In one embodiment, the templates in the set 314 are initially generating by observing the queries received by the DBMS 110 during a training period. Each observed query is canonicalized (i.e., generalized) to match different instances of the same query and is added to the set of query templates 314.

For example, in one embodiment a query is canonicalized by removing the literals (i.e., the specific string and/or numeric values) from the parameterizable fields of the query. Consider the two following non-canonicalized SQL queries:
SELECT * FROM USERS WHERE NAME='cindy' AND PASS='boop'
SELECT * FROM USERS WHERE NAME='abe' AND PASS='network'.
Each of these queries has two parameterizable fields, "NAME" and "PASS." These queries are canonicalized to a single query template as follows:
SELECT * FROM USERS WHERE NAME=' ' and PASS=' '.
In other embodiments, query templates 314 are generated using other techniques in addition to, or instead of, the one described here.

In one embodiment, the query analysis module 312 converts an incoming query to canonical form and determines whether it matches a query template in the set 314. If the query matches, then it is classified as legitimate. If the canonicalized query does not match a template, then the query analysis module 312 classifies it as anomalous. A query might be anomalous, for example, because the database 118 changed since the training period and query templates 314 no longer accurately describe the legitimate queries. Alternatively, a query might be anomalous because it contains a malicious code injection.

A change adaptation module 316 analyzes anomalous queries and determines whether the queries are anomalous due to changes to the database 118. If a query is anomalous due to a database 118 change, one embodiment of the change adaptation module 316 canonicalizes the anomalous query and adds it to the set of legitimate query templates 314. To make its determination, the change adaptation module 316 builds and maintains a list 318 of legitimate field and table names (collectively referred to as "labels") in the database 118.

If an anomalous query received by the change adaptation module 316 contains a label that is not in the list 318, this fact is a strong indication that the query is anomalous due to a change in the database 118. Therefore, the query is possibly legitimate and is a candidate for the set of template queries 314. However, such a query should not be added to the template queries 314 automatically because this step would allow an attacker to spoof the DIDS 120 by adding a new label to the query. Accordingly, an embodiment of the change adaptation module 316 performs additional analyses of the query as described below.

A reporting module 320 reports the results of the analyses performed by the query analysis 312 and/or other modules. The reporting module 320 is administrator-configurable to provide different types of logging and/or alerts based on the classification of the query. For example, the query reporting module 320 can be configured to log anomalous queries that the change adaptation module 316 adds to the query templates module 314. Similarly, one embodiment of the reporting module 320 logs queries that are determined legitimate, but the DIDS 120 does not automatically add the queries to the set of legitimate query templates. In this latter embodiment, the administrator can review the log and select certain queries to add to the legitimate set. In other embodiments, the reporting module 320 logs the anomalous queries in categories based on characteristics of the queries, such as the frequency that the query is received, the labels utilized by the queries, etc. Likewise, the reporting module 320 can be configured to generate an alert in response to certain types of queries, such as anomalous queries that return sensitive data.

Figure 4:
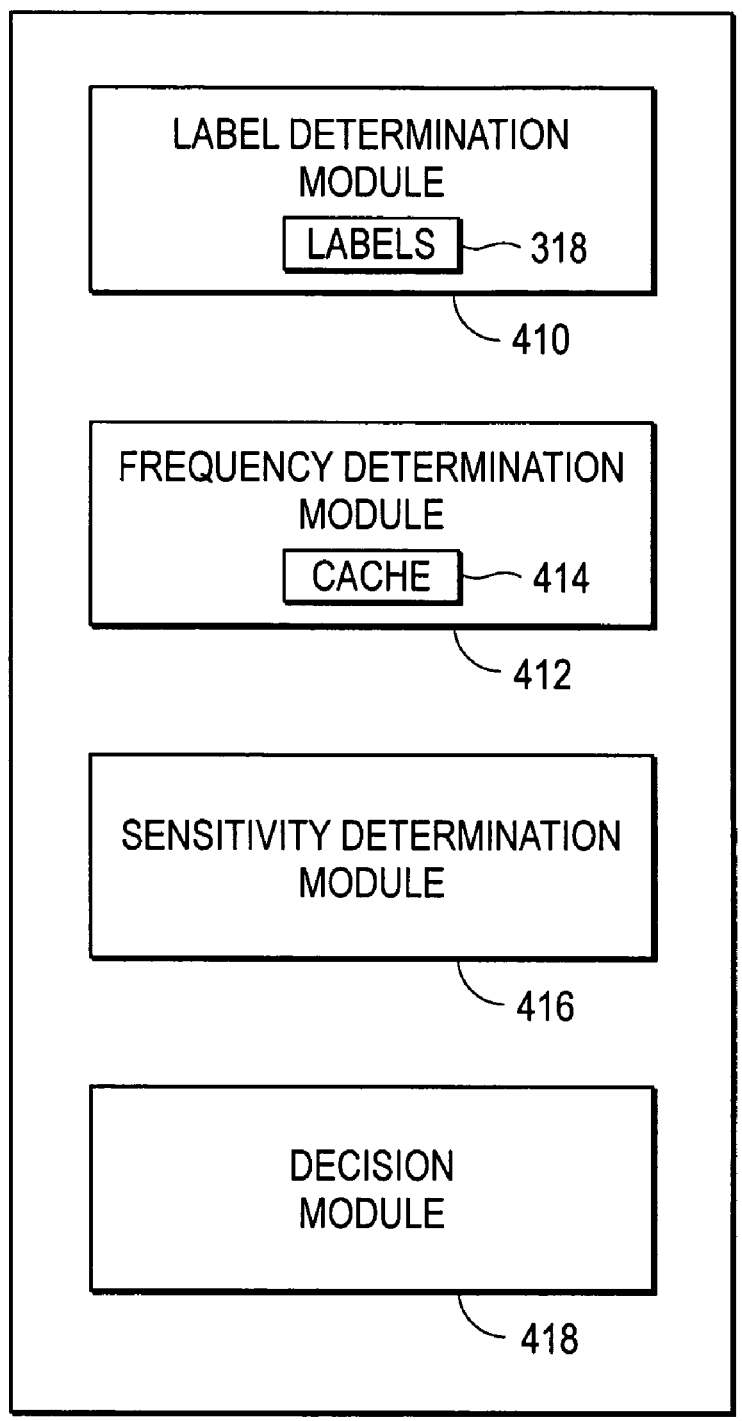
FIG. 4 is a high-level block diagram showing a more detailed view of the change adaptation module of the DIDS according to one embodiment.

FIG. 4 is a high-level block diagram showing a more detailed view of the change adaptation module 316 according to one embodiment. A label determination module 410 creates and maintains the list 318 of labels found in legitimate queries, and also determines whether incoming queries contains labels in the list. In one embodiment, the label determination module 410 observes queries during a training period and adds the labels observed during that period to the list 318. In another embodiment, the label determination module 410 extracts the labels from the query templates 314 maintained by the query analysis module 312. In still another embodiment, the list of labels 318 is provided by the administrator. When the change adaptation module 316 receives an anomalous query, the label determination module 410 determines whether the labels of the query are contained in the list 318. A finding by the label determination module 410 that a query contains a label that is not in the list tends to support a finding that the query is legitimate and that the query is anomalous because of a change to the database 118.

A frequency determination module 412 analyzes the frequency and/or sources of anomalous queries and determines whether these factors tend to indicate that the query is legitimate. An anomalous query that is received at a high frequency from many different sources (i.e., different clients 112) tends to support a finding that the query is legitimate. One would expect a query containing a special-crafted code injection attack to be received relatively few times from few sources. In contrast, one would expect legitimate queries to be received at a high frequency from many different sources. In one embodiment, receipt of an anomalous query from at least 10 different locations is considered evidence that the query is legitimate.

In one embodiment, the frequency determination module 412 tracks the instances and sources of anomalous queries using a cache 414. The cache 414 identifies each query by, for example, storing the query in canonical form, and also stores a record indicating the number of times that the query was encountered. In one embodiment, the record indicates the total number of times the query was encountered; in another embodiment, the record counts the number of times the query was received within a given time period, such as the previous 24 hours.

In one embodiment, the cache of anomalous queries 414 stores information describing the sources from where the queries were received. This information can include the IP address, host name, or other description of the client 112 that sent the query. Similarly, the information can record whether the query was received from inside or outside an enterprise (i.e., was the query received from someone working for the company that maintains the database 118, or from outside the company?).

A sensitivity determination module 416 determines whether an incoming query references and/or produces sensitive data. Such queries are treated with special care. For example, in one embodiment, anomalous queries that reference or produce sensitive data are logged by the reporting module 320 for review by an administrator, and the queries are not added to the set of legitimate query templates 314.

For an incoming query, one embodiment of the sensitivity determination module 416 determines whether the query references fields and/or tables in the database 118 that have been designated as "sensitive" by the administrator. For example, the administrator can designate fields that hold names, addresses, credit card and social security numbers, etc. as sensitive.

One embodiment of the sensitivity determination module 416 analyzes data output by the database 118 in response to an anomalous query and determines whether the data contains sensitive information. In one embodiment, the sensitivity determination module 416 uses pattern matching, heuristics, and/or other techniques to identify particular types of sensitive data. Some data, such as social security and credit card numbers, conform to given formats and the sensitivity determination module 416 checks whether the data fits the formats. For example, a credit card number contains 13-16 digits, begins with one of a limited set of prefixes, and conforms to a checksum formula. Thus, one embodiment of the sensitivity determination module 416 tests outgoing data to see if it contains any numeric strings that have these characteristics. Other sensitive information that conforms to an established format, such as addresses, can be detected using similar techniques.

In one embodiment, the sensitivity determination module 416 can block an incoming query from executing on the database 118. Blocking is desirable, for example, when a query is anomalous and references one or more sensitive fields or tables. Likewise, an embodiment of the sensitivity determination module 416 can trap outgoing data and prevent it from reaching the source of the query. Trapping data is desirable, for example, when the query is anomalous and produces data containing sensitive information.

One embodiment of the change adaptation module 316 includes a decision module 418 that evaluates the tests performed by the other modules according to a security policy and determines whether an anomalous query is legitimate. The security policy can be specified by an administrator and describes the weighting applied to the various tests performed by the change adaptation module 316. In one embodiment, the security policy specifies that the result of the test performed by the label determination module 410 has the highest weight and the result of the frequency determination module 412 has the next highest weight. However, a query directed to sensitive information, or one that produces results containing sensitive data, overrides the other tests and prevents the query from being added to the legitimate set. Thus, the decision module 418 configured according to this security policy would likely decide that an anomalous query including a label not in the list 318 and is encountered at a high frequency is legitimate, provided that the query does not involve sensitive information. On the other hand, an anomalous query that contains a label in the list 318 and is received infrequently will likely not be added to the set of legitimate queries 314.

Figure 5:
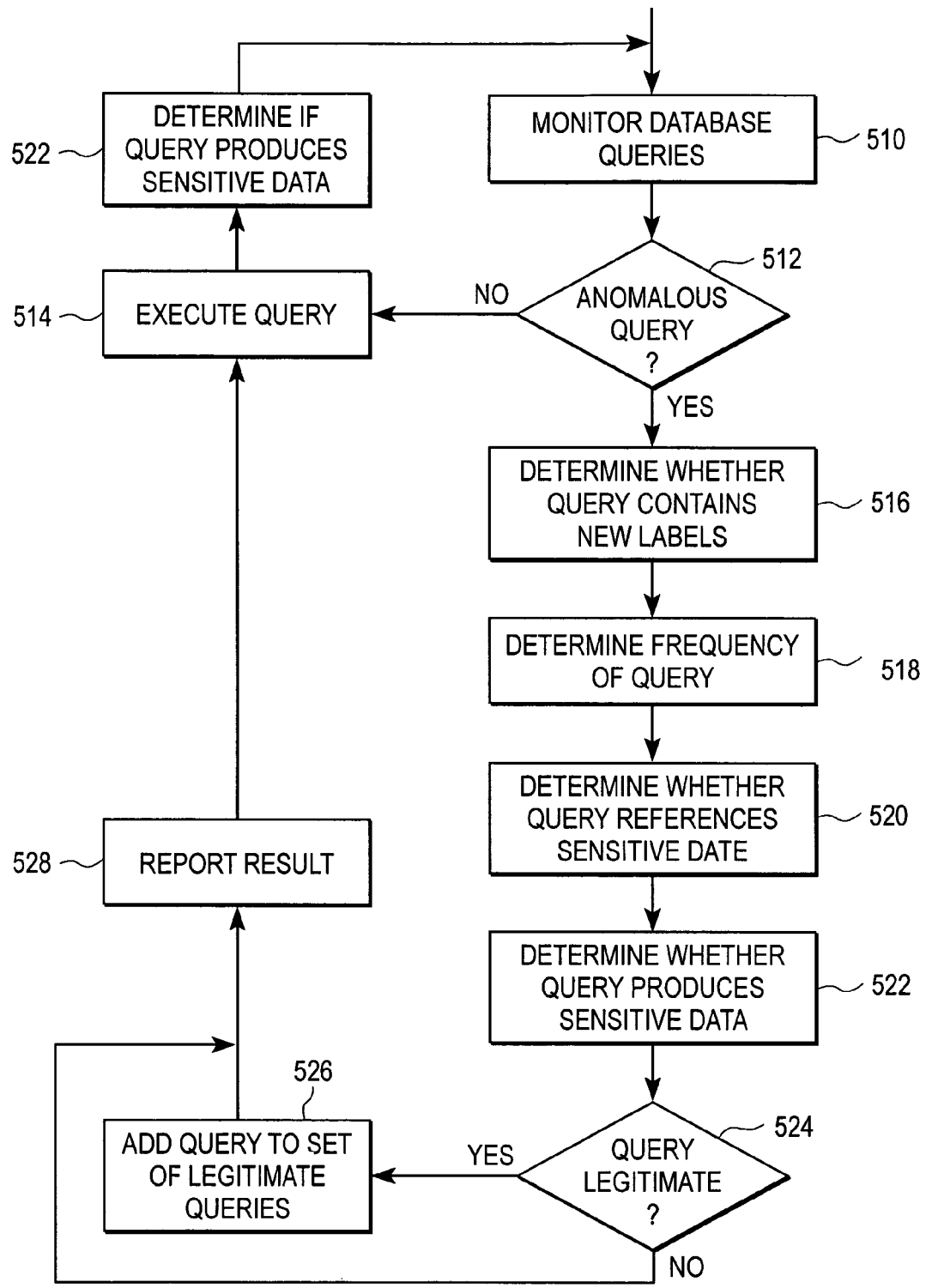
FIG. 5 is a flow chart illustrating steps performed by one embodiment of the DIDS to train itself to recognize new legitimate queries.

FIG. 5 is a flow chart illustrating steps performed by one embodiment of the DIDS 120 to train itself to recognize new legitimate queries. Those of skill in the art will recognize that other embodiments can perform different and/or additional steps. Moreover, other embodiments can perform the steps in different orders than the one described herein.

The DIDS 120 monitors 510 queries sent by clients 112 to the database 118. When the DIDS 120 receives a query, it determines 512 whether the query is legitimate or anomalous. To perform this step, one embodiment of the DIDS 120 determines whether the canonical form of the received query matches a template of a legitimate query. If 512 the query is legitimate, the query is executed 514 on the database 118 and the results are returned to the client 112.

If 512 the query is anomalous, the DIDS 120 evaluates whether the anomaly is caused by a change to the underlying database structure. The DIDS 120 determines 516 whether the query contains labels that are not present in the set of legitimate queries. The presence of a new label is evidence of a change in the database 118. The DIDS 120 also determines 518 the frequency of the query and whether the query has been received from multiple sources. These determinations can be made, for example, by updating a counter associated with the query and recording the source of the query. A high frequency from a variety of sources tends to support a finding that the anomaly in the query is due to a change in the database 118.

An embodiment of the DIDS 120 further determines 520 whether the query references tables or fields in the database 118 designated as "sensitive" by an administrator. Further, an embodiment of the DIDS 120 determines whether the query produces 522 sensitive data when it is executed on the database 118. A query that references sensitive areas of the database and/or produces sensitive data is less likely to be automatically added to the set of legitimate queries.

The DIDS 120 evaluates the results of the tests set forth above according to a security policy and determines whether 524 the anomalous query is legitimate. If 524 the query is legitimate, the DIDS 120 adds 526 the canonical form of the query to the set of legitimate queries 314. If necessary, the DIDS 120 also updates the set of labels 318 to include the labels from the (formerly) anomalous query. Of course, if the DIDS 120 determines 524 that the query is not legitimate, then the DIDS does not add the query to the legitimate set 314.

The DIDS 120 reports 528 the results of its determinations and/or actions. This reporting 528 can take the form of logging the actions of the DIDS 120. For example, the DIDS 120 can log the anomalous queries received by the DIDS, the queries added to the set of legitimate queries 314, the sources of the anomalous queries, etc. In addition, the reporting 528 can include generating alerts to the administrator. For example, the DIDS 120 can alert the administrator that an anomalous query that generates sensitive data has been encountered.

As is evident from the discussion above, the DIDS 120 can operate in a passive mode or a blocking mode, or a hybrid of the two modes. In the passive mode, the DIDS 120 observes and reports on the queries but does not take any steps to interrupt the communication process between the client 112 and the database 118. For example, in passive mode the DIDS 120 will allow an anomalous query to execute, even if the query accesses sensitive information. In blocking mode, the DIDS 120 blocks certain queries from executing and/or blocks certain results from reaching the client 112. The DIDS 120 operating in blocking mode might, for example, prevent query results that contain sensitive information from reaching the client 112 that generated the query. Likewise, a blocking DIDS 120 might block anomalous queries from executing.

The DIDS 120 thus reduces false positive detections of anomalous queries by automatically retraining itself to classify some anomalous queries as legitimate. The tests performed by the DIDS 120 distinguish between queries that are anomalous due to code injection attacks or other malicious techniques, and queries that are anomalous due to changes in the database 118. Accordingly, there is only a minimal chance that a malicious query will be classified as legitimate.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A computer program product having a non-transitory computer-readable medium having executable computer program instructions recorded thereon for training a database intrusion detection system, the computer program instruction comprising instructions configured to:
    receiving a query requesting data from a database;
    determining whether the query is anomalous;
    if the query is not anomalous, classifying the query as legitimate;
    if the query is anomalous, determining whether the anomaly is due to a change in the database by determining whether a label used in the query is in a set of labels that are used by legitimate database queries; and
    if the anomaly is due to a change in the database, classifying the query as legitimate.

2. The computer program product of claim 1, wherein determining whether the received database query is anomalous comprises:
    converting the received query into a canonical form;
    comparing the canonical form of the received query to a set of legitimate template queries; and
    classifying the received query as anomalous if the canonical form of the query does not match a legitimate template query in the set.

3. The computer program product of claim 1, wherein determining whether the anomaly is due to a change in the database comprises:
    treating a determination that a label used in the query is not in the set as evidence that the anomaly is due to a change in the database.

4. The computer program product of claim 1, wherein determining whether the anomaly is due to a change in the database comprises:
    determining a frequency at which the anomalous query is received.

5. The computer program product of claim 1, wherein determining whether the anomaly is due to a change in the database comprises:
    determining whether the anomalous query is received from multiple sources.

6. The computer program product of claim 1, wherein at least some of the data in the database are classified as sensitive and wherein the computer program instructions further comprise instructions for:
    determining whether the anomalous query accesses the sensitive data; and
    continuing to classify the query as anomalous if it accesses the sensitive data.

7. The computer program product of claim 1, wherein the computer program instructions further comprise instructions for:
    receiving data output by the database responsive to the anomalous query; and
    determining whether the data output by the database are sensitive.

8. The computer program product of claim 7, wherein the set of labels that are used by legitimate database queries contains legitimate field names or legitimate table names.

9. A database intrusion detection system (DIDS) comprising:
    a computer processor adapted to execute computer program modules; and
    a non-transitory computer-readable storage medium storing executable computer program modules comprising:
        a receiving module adapted to receive a query requesting data from a database;
        a query analysis module adapted to determine whether the query is anomalous;
        a change adaptation module adapted to determine whether an anomalous query is anomalous due to a change in the database by determining whether a label used in the query is in a set of labels that are used by legitimate database queries and, responsive to a positive determination, classify the query as legitimate.

10. The DIDS of claim 9, wherein the query analysis module is adapted to perform steps comprising:
    converting the received query into a canonical form;
    comparing the canonical form of the received query to a set of legitimate template queries; and
    classifying the received query as anomalous if the canonical form of the query does not match a legitimate template query in the set.

11. The DIDS of claim 9, wherein the change adaptation module is further adapted to treat a determination that a label used in the query is not in the set as evidence that the anomaly is due to a change in the database.

12. The DIDS of claim 9, wherein the change adaptation module further comprises:
    a frequency determination module adapted to determine a frequency at which the anomalous query is received.

13. The DIDS of claim 9, wherein the change adaptation module further comprises:
    a frequency determination module adapted to determine whether the anomalous query has been received from a plurality of sources.

14. The DIDS of claim 9, wherein at least some data in the database are classified as sensitive and wherein the change adaptation module further comprises:

a sensitivity determination module adapted to determine whether the anomalous query accesses the sensitive data.

15. The DIDS of claim 9, wherein the receiving module is further adapted to receive data output by the database responsive to the anomalous query and wherein the change adaptation module further comprises:
a sensitivity determination module adapted to determine whether the data output by the database are sensitive.

16. The DIDS of claim 15, wherein the sensitivity determination module is further adapted to determine whether the data output by the database include information in a known format.

17. The DIDS of claim 9, wherein the change adaptation module further comprises:
a decision module adapted to evaluate results of tests performed on the anomalous query according to a defined security policy and decide whether the database query is legitimate.

18. A method of training a database intrusion detection system, comprising:
receiving a query requesting data from a database;
determining whether the query is anomalous;
if the query is not anomalous, classifying the query as legitimate;
if the query is anomalous, determining whether the anomaly is due to a change in the database by determining whether a label used in the query is in a set of labels that are used by legitimate database queries; and
if the anomaly is due to a change in the database, classifying the query as legitimate.

19. The method of claim 18, wherein determining whether the received database query is anomalous comprises:
converting the received query into a canonical form;
comparing the canonical form of the received query to a set of legitimate template queries; and
classifying the received query as anomalous if the canonical form of the query does not match a legitimate template query in the set.

20. The method of claim 18, wherein determining whether the anomaly is due to a change in the database comprises:
treating a determination that a label used in the query is not in the set as evidence that the anomaly is due to a change in the database.

21. The method of claim 18, wherein determining whether the anomaly is due to a change in the database comprises:
determining a frequency at which the anomalous query is received; and
treating a determination that the anomalous query is received at a high frequency as evidence that the anomaly is due to a change in the database.

22. The method of claim 18, wherein determining whether the anomaly is due to a change in the database comprises:
determining whether the anomalous query is received from multiple sources; and
treating a determination that the query is received from multiple sources as evidence that the anomaly is due to a change in the database.

23. The method of claim 18, further comprising:
classifying at least some data in the database as sensitive; and
determining whether the anomalous query accesses the sensitive data.

24. The method of claim 18, further comprising:
receiving data output by the database responsive to the anomalous query; and
determining whether the data output by the database are sensitive.

25. The method of claim 24, wherein determining whether the data output by the database are sensitive comprises:
determining whether the data output by the database include information in a known format.

* * * * *